(12) United States Patent
Spencer

(10) Patent No.: US 9,721,085 B1
(45) Date of Patent: Aug. 1, 2017

(54) METHOD AND BATTERY PACK DEVICE WITH ANTENNA AND DIODE

(71) Applicant: Maxim Integrated Products, Inc., San Jose, CA (US)

(72) Inventor: Robert Spencer, Garland, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 421 days.

(21) Appl. No.: 14/317,779

(22) Filed: Jun. 27, 2014

Related U.S. Application Data

(60) Provisional application No. 61/917,859, filed on Dec. 18, 2013.

(51) Int. Cl.
   *G06F 21/44* (2013.01)
   *G06K 19/07* (2006.01)

(52) U.S. Cl.
   CPC ......... *G06F 21/44* (2013.01); *G06K 19/0723* (2013.01); *H01L 2924/00* (2013.01); *Y10T 29/49018* (2015.01)

(58) Field of Classification Search
   CPC .......... H01L 2924/00; Y10T 29/49018; G06K 19/0723
   See application file for complete search history.

(56) References Cited

U.S. PATENT DOCUMENTS

| 8,810,194 | B2* | 8/2014 | Kirby | H01M 10/46 320/108 |
| 2009/0204170 | A1* | 8/2009 | Hastings | A61N 1/0565 607/33 |
| 2011/0050389 | A1* | 3/2011 | Kruest | G06K 7/0008 340/5.8 |
| 2013/0291062 | A1* | 10/2013 | Bursell | G06F 21/44 726/4 |
| 2014/0073071 | A1* | 3/2014 | Diorio | G06K 19/0723 438/26 |
| 2014/0266624 | A1* | 9/2014 | Van Bosch | G06K 7/087 340/10.1 |
| 2014/0313092 | A1* | 10/2014 | Raggam | H01Q 7/08 343/788 |

\* cited by examiner

*Primary Examiner* — Mohamed Barakat
(74) *Attorney, Agent, or Firm* — Advent, LLP

(57) ABSTRACT

A device and system are described that include an authentication device having a battery, at least one battery contact, an antenna, at least one antenna contact, a ferrite material barrier, a diode electrically coupled to a battery contact and an antenna contact, and an authenticator coupled to the diode, a battery contact, and an antenna contact. A system includes the device with an authentication device, a transceiver electrically coupled to a near field communication contact, a switch electrically coupled to the transceiver and an antenna contact, and a communication system electrically coupled to the switch.

13 Claims, 3 Drawing Sheets

METHOD AND BATTERY PACK DEVICE WITH ANTENNA AND DIODE

BACKGROUND

Electronic devices, such as smart phones, tablet computers, digital media players, and other devices often use near field communication to establish radio communication with other similar devices. Near field communication can include a set of standards for devices to communicate with each other when in close proximity. Near field communication can be enabled by using an antenna in the electronic device for transmitting and/or receiving radio communication.

SUMMARY

A device and system are described that include an authentication device having a battery, at least one battery contact, an antenna, at least one antenna contact, a ferrite material barrier, a diode electrically coupled to a battery contact and an antenna contact, an authenticator coupled to the diode, a battery contact, and an antenna contact. A system includes the device with an authentication device, a transceiver electrically coupled to a near field communication contact, a switch electrically coupled to the transceiver and an antenna contact, and a communication system electrically coupled to the switch. In implementations, a method for using the device and system include receiving an authentication signal from a single wire communicator chip; authenticating the authentication signal from the single wire communicator chip; allowing a radio frequency signal if the authentication signal is authenticated; and inhibiting the radio frequency if the authentication signal is not authenticated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

DETAILED DESCRIPTION

Overview

Electronic devices, such as smart phones, can often include near field communication capability and/or other radio frequency capability for sending/receiving radio frequency communications to/from other devices in close proximity. Often, device manufacturers include device authentication in their communication devices, for example the use of an electronic signature and/or a public key infrastructure. Additionally, use of authentication can prevent the use of counterfeit goods in a manufacturer's device. Mobile device manufacturers desire to protect against the use of unauthorized peripherals, such as battery packs, without adding pins or other significant costs. A manufacturer frequently needs to implement authentication into the current functionality and form of a communications device.

Accordingly, a device and system are described that include an authentication device having a battery, at least one battery contact, an antenna, at least one antenna contact, a ferrite material barrier, a diode electrically coupled to a battery contact and an antenna contact, and an authenticator coupled to the diode, a battery contact, and an antenna contact. A system includes the device with an authentication device, a transceiver electrically coupled to a near field communication contact, a switch electrically coupled to the transceiver and an antenna contact, and a communication system electrically coupled to the switch. In implementations, a method for using the device and system include receiving an authentication signal from a single wire communicator chip; authenticating the authentication signal from the single wire communicator chip; allowing a radio frequency signal if the authentication signal is authenticated; and inhibiting the radio frequency if the authentication signal is not authenticated.

Example Implementations

Figure 1:
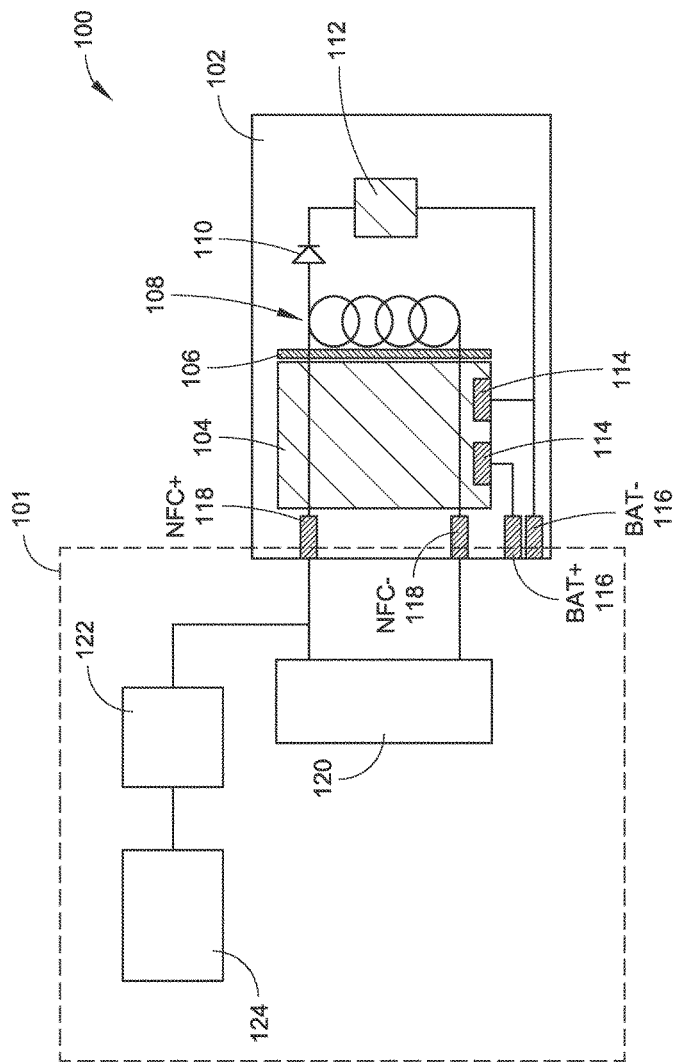
FIG. 1 is a diagrammatic view illustrating an embodiment of an authentication device and system that includes a battery, an antenna, an authenticator, and a diode in accordance with an example implementation of the present disclosure.

FIG. 1 illustrates a device 100 in accordance with an example implementation of the present disclosure. As shown in FIG. 1, the device 100 includes an authentication device 102. In implementations, the authentication device 102 includes at least one battery 104, battery interconnects, and a case and/or housing for at least some of the components that are included within the authentication device 102. In implementations, the battery 104 can include a device having one or more electrochemical cells configured to convert stored chemical energy into electrical energy. Some examples of a battery suitable to be used in device 100 can include a nickel-cadmium battery, a nickel-zinc battery, a nickel metal hydride battery, and/or a lithium-ion battery. It is contemplated that other types of batteries may be used in the device 100. The battery 104 can include a negative electrode material, a positive electrode material, an electrolyte that allows ions to move between the negative electrode and the positive electrode, and terminals that allow electrical current to flow from the battery 104 to another device. In some embodiments, the authentication device 102 can include more than one battery 102. However, in some specific implementations, the authentication device 102 may not include a battery.

Interconnects in the authentication device 102 may include the wiring and/or electrical connections that provide electrical conductivity between the components within the authentication device 102 (e.g., from the battery 104 to an outside device, such as a phone or computer tablet). A housing and/or case can include structure that is configured to contain and/or protect the authentication device 102 and other components within the authentication device 102. In some embodiments, the authentication device 102 may include a polymer or other protective material. In one instance, a housing (not shown) for the authentication device 102 can include a plastic case configured to protect the battery 104 within the authentication device 102.

As shown in FIG. 1, the battery 104 can include at least one battery contact 114. In some implementations, the at least one battery contact 114 can include terminals from which electrical current can flow to or from the battery 104. In one embodiment, the battery 104 includes a positive battery contact and a negative battery contact configured to electrically couple the battery 104 to other electrical interconnects within the communication device 100. In some embodiment, the battery contact(s) 114 can include conductive materials, (e.g., copper, aluminum, etc.).

The authentication device 102 includes an antenna 108. An antenna 108 can include, for example, an antenna configured to facilitate near field communication, which includes a set of standards for smartphones and similar devices to establish radio communication with other radio frequency devices (e.g., near field communication) by touching the devices together and/or placing each device proximate to the other device. In some implementations, near field communication is possible between a NFC device and an unpowered device, such as a near field communication chip. The antenna 108 can be electrically coupled to at least one contact 118, which can be disposed on the outer surface of the authentication device 102. In one specific embodiment, the battery pack has two contacts 118 (e.g., terminals) disposed on and/or exposed to the outer surface of the authentication device 102, where a first contact 118 is electrically connected to a first side of the antenna 108 and a second contact 118 is electrically connected to a second side of the antenna 108. The antenna 108 may be configured to receive and/or transmit other types of communications and/or radio frequency. In some implementations, the antenna 108 can include other antennas, for example a loop antenna, which may also be configured for WiFi and Bluetooth use.

As illustrated in FIG. 1, an antenna 108 can be disposed proximate to the battery 104 with a ferrite material 106 disposed between the battery 104 and the antenna 108. In implementations, the ferrite material 106 can include material that can increase radiation resistance and have high electrical resistance. Some examples of a ferrite material 106 that may be configured to be disposed between the battery 104 and the antenna 108 can include manganese zinc (MnZn) ferrite and/or nickel zinc (NiZn) ferrite.

As illustrated in FIG. 1, the authentication device 102 includes an authenticator 112 and a diode 110. In implementations, the authenticator 112 can include a chip configured for authentication using a cryptographic hash function or other encryption capability. In one embodiment, the authenticator 112 can provide authentication of the authentication device 102 using, for example, SHA-2 functions (e.g., SHA-224, SHA-256, SHA-384, SHA-512, etc.). In some examples, the authenticator can include a chip that acts as a slave that receives an authentication signal from a communication system, such as the communication system 124 illustrated in FIG. 1. It is contemplated that the authenticator 112 can use other methods of authentication.

In implementations, the diode 110 can include a diode bridge. A diode bridge can include an arrangement of at least four diodes in a bridge circuit configuration that provides the same polarity of output for either polarity of output. In the embodiment illustrated in FIG. 1, the diode 110 can be electrically coupled with a NFC+ contact 118 and the authenticator 112, which can be further electrically coupled to a battery (BAT-) contact 114. In this embodiment, the battery (BAT-) contact 114 can also function as the ground of the local circuit.

As shown in FIG. 1, the device 100 and authentication device 102 may be coupled to a transceiver 120, a switch 122, and/or communications system 124, which can be included as at least a portion of a mobile device 101 (e.g., a cell phone, a smart phone, etc.). In implementations, a transceiver 120 can include a device that includes both a transmitter and a receiver, which are combined and share common circuitry and/or a single housing. In an embodiment, the transceiver 120 can send and/or receive an authentication signal to and/or from the antenna 108 after an authentication signal is authenticated. A switch 122 can include an electrical component configured to break an electrical circuit and interrupt flowing current. In some implementations, the switch 122 may include a high impedance switch. The switch 122 may be electrically coupled to the transceiver 120, a communications system 124, and a contact 118 (e.g., the NFC+ contact).

As illustrated in FIG. 1, the device 100 can include a communications system 124. For example, the communications system 124 can include a system using a one wire protocol. A one wire protocol can include a device communications bus system that provides low-speed data, signaling, and power over a single signal. In one specific embodiment, the communications system 124 can function as a single wire protocol master device with the authenticator 112 functioning as a slave device. In this embodiment, the communications system 124 can send an authentication signal via switch 122 and contact 118 (e.g., NFC+) to the diode 110 and authenticator 112 in order to authenticate the authentication device 102 for a device 100 (e.g., a phone, a tablet computer, a medical device, etc).

Figure 2:
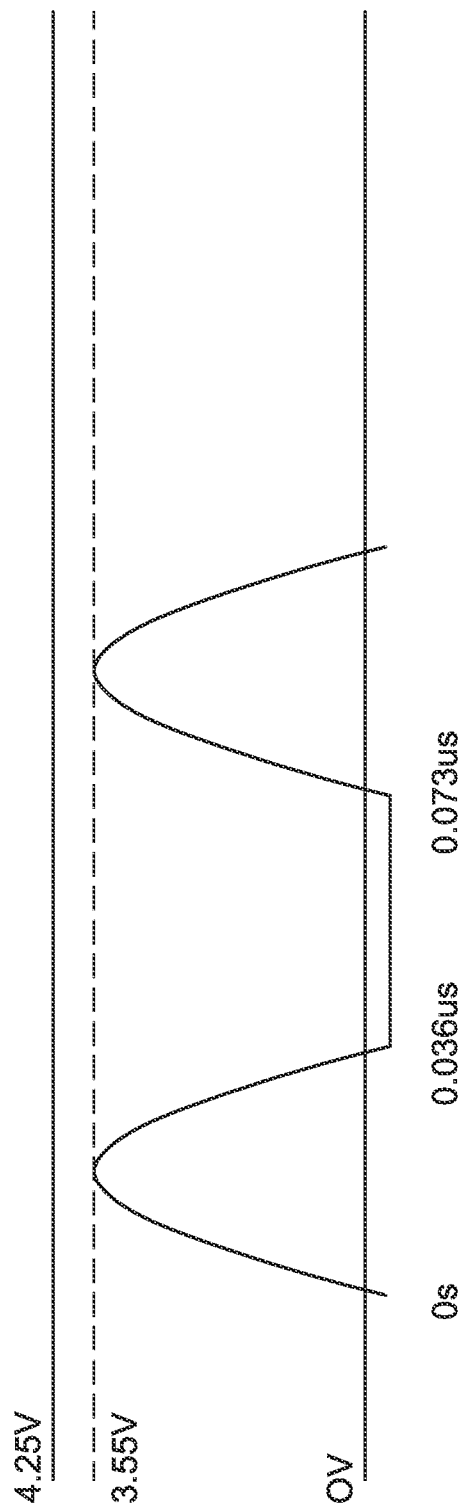
FIG. 2 illustrates a graphical illustration of a voltage over time supplied to an authentication device and system that includes a battery, an antenna, an authenticator, and a diode in accordance with an example implementation of the present disclosure.

FIG. 2 illustrates a graphical depiction of an example voltage supplied to the authentication device 102. In some embodiments, the authentication device 102 is configured to operate with a specific voltage. FIG. 2 illustrates an example voltage where approximately 4 volts is the maximum voltage that a device 100 in this specific example operates. In this case, the diode 110 provides for a voltage drop, which allows voltage protection for the device 100 and authentication device 102.

Example Process

Figure 3:
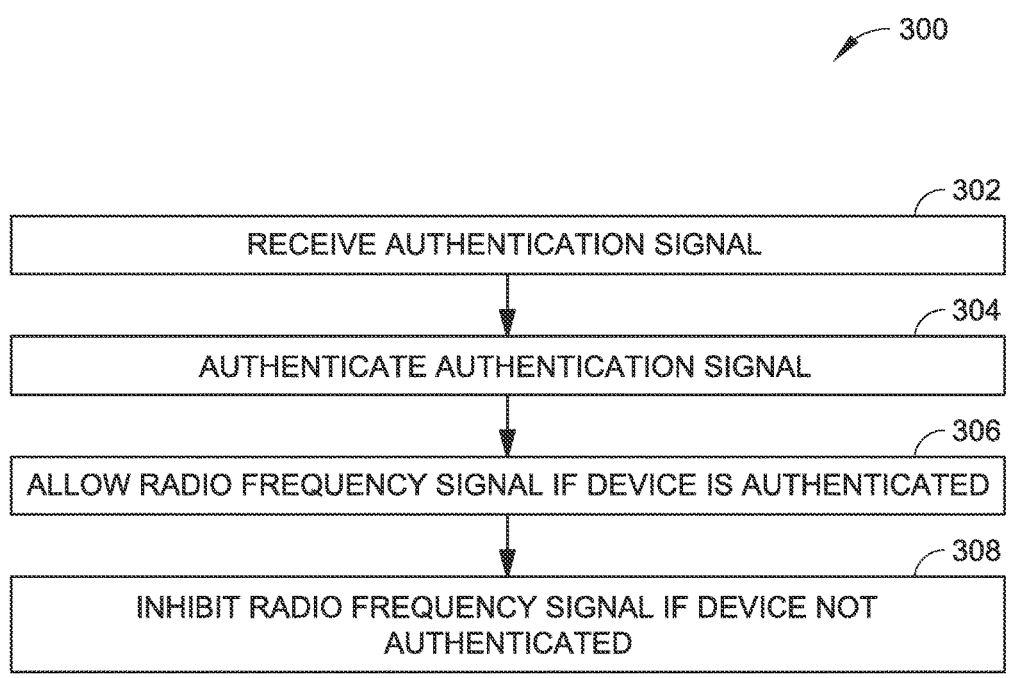
FIG. 3 is a flow diagram illustrating an example process for utilizing a communication device and system, such as the communication device and system illustrated in FIG. 1.

FIG. 3 illustrates an example process 300 that employs an authentication device with authentication capability, such as the device 100 and authentication device 102 shown in FIG. 1.

As shown in FIG. 3, an authentication signal is received (Block 302). In an implementation, receiving an authentication signal can include receiving the authentication signal using authenticator 112, where the authentication signal is transmitted from a communication system 124. In a specific embodiment, a communication system configured with a single wire protocol can send an authentication signal to authenticator 112, such as a SHA-256 authenticator chip. In this embodiment, the authenticator signal can be sent by way of a switch and contact 118 to the authenticator 112.

Next, the authentication signal is authenticated (Block 304). In an implementation, an authenticator 112 receives the authentication signal and determines if the authentication signal is authenticated. Authenticating the authentication signal can include using an authentication chip, such as a chip configured with SHA-2 cryptographic hash functions. In one specific example, authenticating the authentication signal can include using an authentication chip with SHA-256 cryptographic hash functions.

Then, a radio frequency signal is allowed if the authentication signal is authenticated. (Block 306). In an implementation, allowing a radio frequency signal includes determining, using an authenticator 112, that a device is authentic. When the authenticator 112 determines that the device is authentic, the device can then be operated as normal. If the authentication signal is not authenticated, radio frequency is then inhibited (Block 308). In implementations, when the authenticator receives an authentication signal that is determined to not be authenticated, radio frequency signals from the device are inhibited.

As described above and illustrated in the figures, the device 100 uses one antenna pin and a battery pin to connect the power and ground while communicating the authentication of a battery or a peripheral device. Additionally, the process 300 can function to enable authentication of device 100 and/or disable device 100 wireless communication.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An electronic device, comprising:
    an authentication device, including
        a battery;
        at least one battery contact electrically coupled to the battery;
        an antenna;
        at least one antenna contact electrically coupled to the antenna;
        a ferrite material disposed between the battery and the antenna;
        a diode electrically coupled to at least one antenna contact and at least one battery contact; and
        an authenticator electrically coupled to the diode, at least one antenna contact, and at least one battery contact.

2. The electronic device in claim 1, where the antenna includes a near field communication antenna.

3. The electronic device in claim 1, where the antenna includes a loop antenna.

4. The electronic device in claim 1, where the antenna includes an antenna configured for WiFi or Bluetooth communications.

5. The electronic device in claim 1, where the diode electrically coupled to the at least one antenna contact includes a diode bridge.

6. The electronic device in claim 1, where the authenticator includes an authenticator chip configured for authentication using a cryptographic hash function.

7. An electronic system, comprising:
    an authentication device, including
        a battery;
        at least one battery contact electrically coupled to the battery;
        a near field communication antenna;
        at least one near field communication antenna contact electrically coupled to the near field communication antenna;
        a ferrite material disposed between the battery and the near field communication antenna;
        a diode electrically coupled to at least one near field communication antenna contact and at least one battery contact; and
        an authenticator electrically coupled to the diode, at least one near field communication antenna contact, and at least one battery contact;
    a transceiver electrically coupled to the at least one near field communication antenna contact;
    a switch coupled to one near field communication antenna contact; and
    a communication system coupled to the switch.

8. The electronic system in claim 7, where the near field communication antenna includes a loop antenna.

9. The electronic system in claim 7, where the diode electrically coupled to the at least one antenna contact includes a diode bridge.

10. The electronic system in claim 7, where the authenticator includes an authenticator chip configured for authentication using a cryptographic hash function.

11. The electronic system in claim 7, where the switch includes a high impedance switch.

12. The electronic system in claim 7, where the communication system includes a single wire protocol system.

13. The electronic system in claim 7, further comprising a mobile device.

* * * * *